US011572215B2

(12) United States Patent
Heimann

(10) Patent No.: US 11,572,215 B2
(45) Date of Patent: Feb. 7, 2023

(54) LABELLING MACHINE FOR LABELLING CONTAINERS

(71) Applicant: KRONES AG, Neutraubling (DE)

(72) Inventor: Norbert Heimann, Obertraubling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 17/414,305

(22) PCT Filed: Oct. 1, 2019

(86) PCT No.: PCT/EP2019/076516

§ 371 (c)(1),
(2) Date: Jun. 15, 2021

(87) PCT Pub. No.: WO2020/126141

PCT Pub. Date: Jun. 25, 2020

(65) Prior Publication Data

US 2022/0017252 A1 Jan. 20, 2022

(30) Foreign Application Priority Data

Dec. 21, 2018 (DE) ..................... 10 2018 222 764.0

(51) Int. Cl.
*B32B 41/00* (2006.01)
*B65C 9/40* (2006.01)
(Continued)

(52) U.S. Cl.
CPC .............. *B65C 9/40* (2013.01); *B65C 9/0062* (2013.01); *B65C 9/02* (2013.01)

(58) Field of Classification Search
CPC ............ B65C 9/40; B65C 9/0062; B65C 9/02
See application file for complete search history.

(56) References Cited

U.S. PATENT DOCUMENTS 6,982,953 B1 1/2006 Swales
2002/0161467 A1 10/2002 Hashiguchi et al.
(Continued)

FOREIGN PATENT DOCUMENTS

DE 202004020477 U1 7/2005
DE 102013102360 A1 9/2014
(Continued)

OTHER PUBLICATIONS

ISA European Patent Office, International Search Report Issued in Application No. PCT/EP2019/076516, dated Jan. 16, 2020, WIPO, 4 pages.

*Primary Examiner* — Michael N Orlando
*Assistant Examiner* — Joshel Rivera
(74) *Attorney, Agent, or Firm* — McCoy Russell LLP

(57) ABSTRACT

Labelling machine for labelling containers, having at least one docking station for a labelling apparatus and a machine control system, wherein the docking station comprises at least one network access for establishing a network connection between the machine control system and a docked labelling apparatus, wherein the network connection is designed to transmit security-relevant data and/or time-critical data, and wherein the network access is connected to a manageable Ethernet network switch of the machine control system with a DHCP server, wherein the DHCP server is adapted to assign a preset IP address determined by the DHCP server to a labelling apparatus connected to the network access.

13 Claims, 2 Drawing Sheets

(51) Int. Cl.
*B65C 9/00* (2006.01)
*B65C 9/02* (2006.01)

(56) References Cited

U.S. PATENT DOCUMENTS

2003/0167411 A1* 9/2003 Maekawa ............... H04L 63/08
726/4
2007/0163697 A1* 7/2007 Kursawe ................... B65C 9/40
156/64

FOREIGN PATENT DOCUMENTS

WO 9743583 A1 11/1997
WO 2005068301 A1 7/2005

* cited by examiner

LABELLING MACHINE FOR LABELLING CONTAINERS

CROSS REFERENCE TO RELATED APPLICATIONS

The present application is a U.S. National Phase of International Application No. PCT/EP2019/076516 entitled "LABELLING MACHINE FOR LABELLING CONTAINERS," and filed on Oct. 1, 2019. International Application No. PCT/EP2019/076516 claims priority to German Patent Application No. 10 2018 222 764.0 filed on Dec. 21, 2018. The entire contents of each of the above-listed applications are hereby incorporated by reference for all purposes.

TECHNICAL FIELD

The present invention relates to a labelling machine for labelling containers and to a method for establishing a network connection for transmitting security-relevant data between a labelling machine and a labelling apparatus according to claim 8.

BACKGROUND AND SUMMARY

From the prior art, labelling machines of containers (such as bottles, cans or the like) are known which have a series of docking ports or docking stations to which labelling apparatuses can be connected. Unused locations are usually covered so as not to leave an opening where an operator could unintentionally reach in. This allows flexible modification and adaptation of labelling machines, and places that are not required can remain free.

It is known that an IP address can be assigned to a labelling apparatus in order to transmit data to the specific labelling apparatus. However, this assignment is not completely reliable so that a transmission of data relevant for the occupational security of operators or of time-critical data to the relevant labelling apparatuses cannot always be ensured.

However, as labor law requirements continue to increase and the security of operators of labelling apparatuses is of great importance, especially in the case of fast-moving components, a considerable amount of effort has had to be expended up to now to ensure the security of operators even in the event of incorrect assignment of IP addresses.

Problem

Based on the known prior art, the problem to be solved is to provide a labelling machine and a method for establishing a network connection with which the security of an operator can be ensured as reliably as possible.

Solution

This problem is solved according to the invention by the labelling machine according to independent claim 1 and the method for establishing a network connection according to independent claim 8. Preferred further developments of the invention are defined in the dependent claims.

The labelling machine according to the invention for labelling containers comprises at least one docking station for a labelling apparatus and a machine control system, wherein the docking station comprises at least one network access for establishing a network connection between the machine control system and a docked labelling apparatus, wherein the network connection is adapted to transmit security-relevant data and/or time-critical data, and wherein the network access is connected to a DHCP server by a manageable Ethernet network switch of the machine control system, wherein the DHCP server is adapted to assign a preset IP address determined by the DHCP server to a labelling apparatus connected to the network access.

Security-relevant data is understood here to mean data that is relevant to the security of an operator and, in particular, includes emergency stop functions for an emergency. This also includes data, or information, which is transmitted from the labelling apparatus or docking station to the machine control system. For example, this includes information or data on whether certain circuit breakers or protective walls on the labelling apparatus and/or the docking station and/or the labelling machine are closed. Data or information on whether specific security systems have been switched on, connections have been made between the labelling apparatus and the docking station (in particular locks that prevent the labelling apparatus from detaching from the docking station), or grounding of the apparatus has been carried out can also be included. Security-relevant data can also include information or data on the actuation of release switches, by the actuation of which the operator can confirm, for example, that he is no longer manually reaching into potentially dangerous components of the machine (for example, between rotating cylinders for the transfer and takeover of labels). Security-relevant data can also be understood to mean data and/or information that must be obtained before the labelling machine is put into operation and, in particular, before operation is started in the production mode. This can also be data or information that must be available/confirmed before the labelling machine is approved for normal production operation (by the machine control system). This does not preclude the machine from being operated at reduced speed, for example in a trial run or pre-run mode, even though the relevant data and/or information relevant to the security of the operation of the labelling machine is not yet available/not confirmed. Security-relevant data is usually not data that is only relevant for the operation of the labelling apparatus (quantity of labels to be applied, time coordination of the label supply and the like).

In the following, time-critical data is to be understood as data that is relevant for the chronological sequence of processes during machine operation. This includes, for example, timing signals that establish a machine-wide reference time, or control commands that can only ensure correct operation of the machine if they are received at the labelling apparatus at a specific time. These can also include (confirmation) signals from the labelling apparatus(es) which must be transmitted by the apparatus at a specific time and received by the machine control system or other device in order to ensure the operation of the machine.

The DHCP server and the Ethernet network switch can in principle be provided as separate components. However, it is also possible for the DHCP server to be integrated in the Ethernet network switch, in particular to be arranged in the housing of the Ethernet network switch or to be adapted as a hardware component of the Ethernet network switch. In any case, a connection exists between the DHCP server and the Ethernet network switch, wherein the DHCP server may also be part of or integrated into the Ethernet network switch. Whenever in the following the connection of DHCP server and Ethernet network switch is mentioned, all embodiments in which the DHCP server is adapted as part of or integrated into the network switch are also included.

This labelling machine can ensure that the labelling apparatus is detected at or assigned to the correct docking station and that security-relevant data and/or time-critical data can thus also be transmitted correctly between the machine control system and the labelling apparatus docked at the specific docking station.

It may be provided that the labelling machine comprises at least two docking stations and wherein the IP address assigned by the DHCP server to the different docking stations are different from each other.

This avoids confusion of the docking stations and, in particular, the docked labelling apparatuses or confusion of docking stations at which no labelling apparatuses are currently arranged with docking stations at which labelling apparatuses are docked so that the reliability of the transmission of security-relevant data and/or time-critical data can also be further increased here.

Furthermore, the Ethernet network switch can comprise at least two slots for docking stations.

This provides central management of the network connection for the security-relevant data and/or time-critical data, which reduces the susceptibility to errors caused by confusion of slots.

In one embodiment it is provided that each slot is assigned to a distinct identifier that unambiguously identifies the associated docking station and is different from other identifiers.

In this further development, it is additionally ensured for the compilation or assembly of the labelling machine that an accidental confusion of slots by the operator for the respective docking stations is excluded as far as possible.

Each slot may have a physical marking, wherein connecting to a connection line to connect the slot to a network access of a docking station is possible only if the connection line has a complementary marking.

As a result, a further physical barrier is implemented, which prevents the connections for the individual docking stations from being confused.

Furthermore, each slot can be assigned to an auxiliary pin for transmitting an auxiliary signal, wherein the machine control system is adapted to determine whether a network connection with a docked labelling apparatus has been correctly established based on receiving a signal via the first slot and via the auxiliary pin.

Determining whether a docked labelling apparatus has correctly established a network connection includes, for example, determining whether the security-relevant data and/or the time-critical data and non-security-relevant data are transmitted to the same labelling apparatus, in particular to the intended docking station.

With this embodiment, too, it is further ensured that a deviating assignment of security-relevant data and/or time-critical data and non-security-relevant data and/or non-time-critical data to labelling apparatuses does not occur unintentionally.

In one embodiment, each network access comprises a further network connection to the machine control system adapted to transmit data relevant to the operation of the labelling apparatus, wherein the machine control system is adapted to determine from a comparison of data sent via the first network connection with data sent via the second network connection whether the network connection to the manageable Ethernet network switch has been correctly established.

A comparison as to whether the security-relevant data and the non-security-relevant data and/or non-time-critical data are transmitted to the same labelling apparatus is thus possible, which can further increase the security for operators.

According to the method according to the invention for establishing a network connection for transmitting security-relevant data and/or time-critical data between a labelling machine and a labelling apparatus, wherein the labelling machine comprises at least one docking station for the labelling apparatus and a machine control system, wherein the docking station comprises at least one network access with which the network connection is established between the machine control system and the docked labelling apparatus, it is provided that the network connection is adapted for transmitting the security-relevant data and/or time-critical data, and wherein the network access is connected to a manageable Ethernet network switch of the machine control with a DHCP server, wherein the DHCP server assigns a preset IP address determined by the DHCP server to a labelling apparatus connected to the network access.

This method ensures that a network connection is established as reliably as possible.

It can also be provided that the labelling machine comprises at least two docking stations and wherein the IP address assigned by the DHCP server to the different docking stations are different from each other.

Accidental, ambiguous assignment of IP addresses can thus be avoided, which also enables distinct identification of docking stations and labelling apparatuses.

Furthermore, the Ethernet network switch may include at least two slots for docking stations and a distinct identifier may be assigned to each slot that unambiguously identifies the associated docking station and is different from other identifiers.

This facilitates the assembly of the labelling machine so that the assignment of docking station and connections on the manageable Internet network switch is as reliable as possible and confusion is ruled out.

Each slot may have a physical marking, wherein connecting to a connection line to connect the slot to a network access point of a docking station is possible only if the connection line has a complementary marking.

By means of physical marking, confusion of connections and docking stations can be avoided and thus a distinct assignment of docking stations and labelling apparatuses can be ensured.

Furthermore, an auxiliary pin for transmitting an auxiliary signal may be assigned to each slot, wherein the machine control system determines whether a network connection with a docked labelling apparatus has been correctly established based on receiving a signal via the first slot and via the auxiliary pin.

This comparison can be used to check whether data intended for the same labelling apparatus also arrives at the same labelling apparatus, regardless of whether it is security-relevant data and/or time-critical data or non-security-relevant data and/or non-time-critical data.

In one embodiment, each network access comprises another network connection with the machine control system via which data relevant to the operation of the labelling apparatus is transmitted, wherein the machine control system determines from a comparison of data sent via the first network connection with data sent via the second network connection whether the network connection with the manageable Ethernet network switch has been correctly established.

This embodiment ensures that the correct labelling apparatus is addressed with the security-relevant data and/or time-critical data by checking whether the security-relevant data and/or time-critical data for the specific labelling apparatus and the non-security-relevant data and/or non-time-critical data for the specific labelling apparatus are transmitted to the same addressee, thus, to the same labelling apparatus.

DETAILED DESCRIPTION

Figure 1:
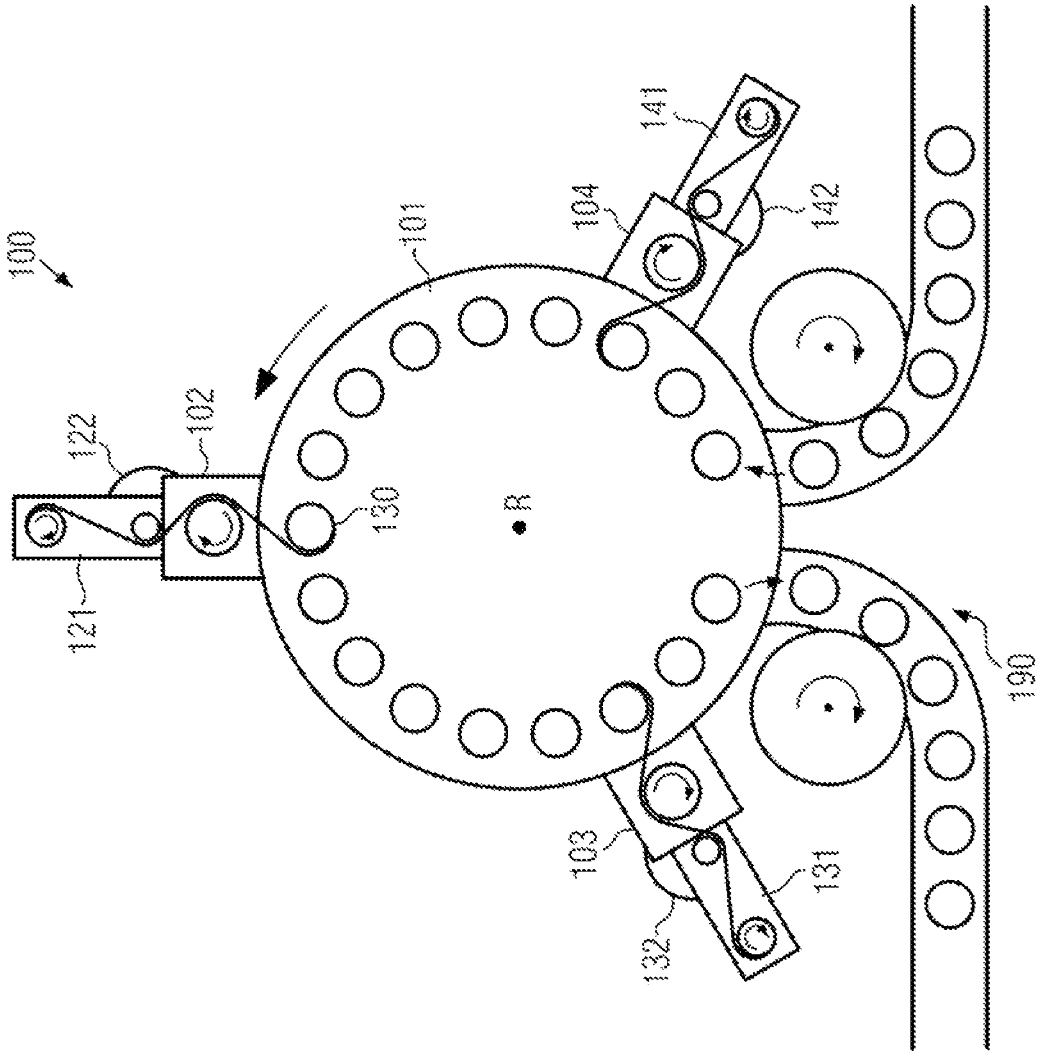
FIG. 1 shows a schematic view of a labelling machine with a series of docking stations according to an embodiment.

FIG. 1 shows a labelling machine 100 according to an embodiment compatible with the invention. In this embodiment, the labelling machine 100 comprises a carousel 101 on which a series of container carriers (not shown here) can be arranged, each of which can take up at least one container 130 and transport it along the periphery of the carousel 101. The containers may be fed to the labelling machine by suitable transport devices (not shown here), and may be transported away from the labelling machine (after labelling) by other suitable trans-port devices. Suitable transport devices include, in particular, star conveyors, such as infeed starwheels and outfeed starwheels for feeding and discharging the containers. Devices with grippers for single or multiple bottles or conveyor belts or combinations thereof are also conceivable. The transport devices to and from the labelling machine are only shown schematically in FIG. 1 by 190. Any other conceivable and known embodiment for transporting containers to or from a labelling machine is conceivable and applicable together with the invention. Likewise, any known variation of transporting the containers through the labelling machine is applicable. The containers may be transported in the container carriers, for example, on turntables or in centering devices or in neck handling.

A series of docking stations 102, 103 and 104 are arranged on the periphery of the carousel 101, to which labelling apparatuses 121, 131 and 141 can be docked. The labelling apparatuses can each be adapted as a modular structural unit and have all the devices required for providing labels and applying them to containers. These include, in particular, cutting devices and, if necessary, gluing units for cutting and applying glue to labels. Transfer devices, such as a vacuum cylinder, may also be arranged on the labelling apparatus to apply the cut and/or glued labels to the containers. Alternatively, however, it may also be provided that one or more devices necessary for applying the labels to the containers 130 are not provided on the labelling apparatus, but at or near the docking station. For example, a transfer cylinder for transferring the labels to the containers for each docking station can be arranged on the labelling machine and thus does not have to be additionally provided on the labelling apparatus.

Instead of an embodiment of the labelling machine as a rotary machine with a carousel and container receptacles arranged thereon, the labelling machine can also be designed as a linearly operating machine. In this case, the container transport extends over a straight transport path, on which labelling apparatuses are also provided via corresponding docking stations, as described with reference to FIG. 1, in order to take up labelling apparatuses.

It is understood that not every docking station has to be permanently equipped with a labelling apparatus. For example, when labelling containers of a first type, it may only be necessary to apply a single label. In this case, for example, only one labelling apparatus 121 is arranged on the periphery. In case of a different container type or a different labelling of the same containers, it can be provided that two labels are applied to each container. In this case, two labelling apparatuses (e.g. the labelling apparatuses 121, 131) can be provided on the periphery of the labelling machine or assigned to corresponding docking stations, wherein each of the labelling apparatuses applies a label to the container.

Alternatively or additionally, one or more labelling apparatuses can be provided as a reserve in case one or more labelling apparatuses fail or run out of labels so that the reserve labelling apparatuses can take over the application of labels to the containers until the supply of labels at the remaining labelling apparatuses is replenished.

A wide variety of embodiments are conceivable for this purpose. In any case, the labelling apparatuses are modular and can be connected to the labelling machine and in particular to the docking stations via suitable connections, in particular data lines 122, 132 and 142. Data relevant to the operation of the labelling apparatuses, for example, is transmitted via these data lines. This includes, for example, a "labelling program" which, for example, determines the container throughput and can additionally define which labels must be applied, when the labels are cut from a label roll with the aid of a cutting tool on the labelling apparatus or with which contact pressure the labels are to be applied to the containers. All parameters relevant to the operation of a labelling machine and in particular a labelling apparatus can be transmitted via a corresponding data line and the examples given are not to be understood as limiting in this respect.

These programs are basically not "security-relevant" and/or not time-critical, their exact assignment to the labelling apparatuses is therefore usually not relevant for the security of an operator during the operation of the labelling machine.

On the other hand, there are also functions that are relevant for operator security. Thus, it is known that emergency switches must be assigned to labelling apparatuses. With the electronic connections meanwhile provided between the labelling apparatuses and the labelling machine or the machine control system of the labelling machine, it must be ensured in this connection that the corresponding security-relevant functions and/or time-critical functions are also assigned to the respective labelling apparatus. For example, it must be ensured that when an emergency stop switch is pressed on a labelling apparatus, precisely this labelling apparatus is deactivated. It must also be ensured that safety doors or openings or access areas are protected from access by an operator before the labelling station can start operation. The information as to whether this protection is provided (e.g. doors are closed or covers are installed) must be assignable to a specific docking station, since otherwise there is a risk that a docking station not equipped with a labelling apparatus will be confused by the machine control system with a docking station at which a labelling apparatus is arranged. If, for the docking station at which the labelling apparatus is arranged, the machine control system is incorrectly informed that no labelling apparatus is arranged at this docking station, the machine control system can incorrectly enable operation of the labelling machine without all the measures and functions relevant to the security of the operator having been correctly taken. This can then result in a considerable risk of injury to the operator.

For this reason, it is provided that, in addition to the data connections normally provided, an unambiguous and preferably error-free assignment of security-relevant information and data and/or time-critical data to a specific docking station and, in particular, to a specific labelling apparatus is allowed.

For this purpose, the circuits and connections of the machine control system with the respective docking stations 102, 103, 104 are adapted such that a labelling apparatus docked with a docking station is assigned a preset, fixed IP address which is significant for the docking station, if possible, and the security-relevant data and/or time-critical data are then transmitted via this IP address.

Figure 2:
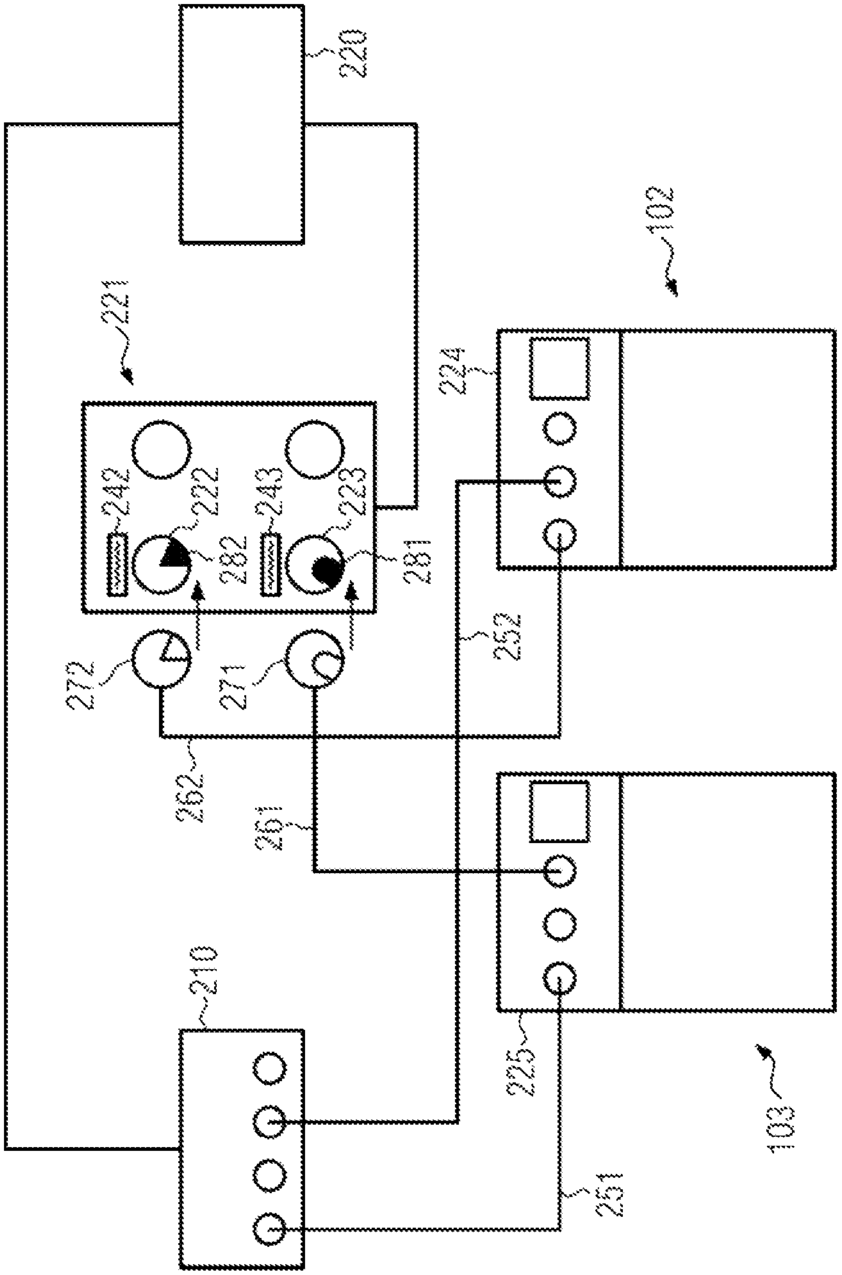
FIG. 2 shows a schematic view of the connection of a docking station to the manageable network switch and the machine control system.

For this purpose, FIG. 2 exemplarily shows the connection of the docking stations 102 and 103 to a managed Ethernet network switch 220, which in turn is connected to the machine control system 210 (the element 210 represents the access points for the machine control system).

The machine control system can, for example, be integrated into the labelling machine shown in FIG. 1. However, it can also be arranged outside the labelling machine. The machine control system can be designed as a computer or other suitable device for controlling the labelling machine.

In the embodiment provided in FIG. 2, the manageable Ethernet network switch 220 includes an access element 221 (having a series of slots or access points 222, 223) through which at least a network connection can be established between a docking station 102 or 103 and the machine control system 210, wherein security-related data and/or time-critical data can be transmitted via this network connection. The access element 221 is shown here separately from the switch 220. However, this is for illustrative purposes only. Although the access element and the Ethernet network switch can be designed as completely separate components, embodiments are also conceivable in which the access element is integrated into the Ethernet network switch, in particular arranged in its housing.

The machine control system can also be connected to the respective docking stations via suitable further connection lines 251 and 252. This connection can also be made via a network switch integrated in the machine control system and can therefore not be realized separately here in the network switch shown. However, only non-time-critical and non-security-relevant data is exchanged between the docking station/labelling apparatus and the machine control system via this connection.

Accordingly, the access points 222 and 223 are connected to the manageable Ethernet network switch 220, for example by internal cabling. In particular, according to the invention, the network accesses are connected to a DHCP server within the Ethernet network switch or to a DHCP server assigned to it. The DHCP server, in turn, assigns a distinct IP address to each of the network accesses so that a fixed, preset IP address is assigned to the corresponding access at the docking station 102 or 103 by the DHCP server. This IP address is in turn used for the communication of security-relevant data and/or time-critical data with a labelling apparatus that may be connected to the docking station so that the machine control system and in particular the Ethernet network switch and the DHCP server connected to it ensure that a known and distinct IP address can be assigned to a labelling apparatus for the transmission of security-relevant data and/or time-critical data.

By doing so, it is ensured that the security-relevant data and/or time-critical data reach the correct labelling apparatus at the correct docking station or that the data transmitted by this station can be correctly assigned to the respective labelling apparatus by the machine control system.

In this context, it is preferred if only one DHCP server is provided for all docking stations of a labelling machine in the Ethernet network switch 220. This ensures that only this DHCP server manages the IP addresses for the respective docking stations, which can avoid incorrect or unintentional assignment of identical IP addresses to different docking stations for the transmission of security-relevant data and/or time-critical data.

Connecting elements, such as cables, typically run between the network access 224 and 225 of the respective docking stations and the accesses 222 and 223 at the corresponding network switch to connect the respective docking station to the access assigned to it. Since the preset IP address is ultimately assigned to access 222 or 223 and is only passed on via the connection to the network access of the docking station, it is important to ensure that the design of the labelling machine avoids unintentional confusion of the accesses to the respective network accesses.

For this purpose, it may be provided that each access 222 and 223 has an at least optical identifier 242 or 243 that allows the respective access to be assigned to the network access of the docking station of the labelling machine. For example, it may be provided that the docking stations are numbered consecutively (sequentially from 1, 2, 3, etc.). Each access can then, for example by means of an optical marking, pass on the information to the operator that this access is provided for a specific docking station, for example the docking station with the number 1 so that, when assembling the labelling machine, and in particular, when establishing the connection between the network access of the docking station with the accesses at the network switch, no unintentional error occurs.

While such an optical identifier or marking may assist the operator in not unintentionally making the wrong connection between the network access of the docking station and the access at the network switch, this embodiment does not fully ensure correct assignment.

Alternatively or additionally, it may therefore be provided that a physical marking 281 or 282 is assigned to at least one of the slots 222 and 223, or that this slot has a physical marking 281 or 282. The connection line (261 or 262) that enables a connection between the network access and the respective slot can then have a physical marking complementary thereto so that only the connection line that has a corresponding complementary physical marking (271 or 272) can be connected to the respective slot on the Ethernet network switch.

For example, the physical marking 281 or 282 on the Ethernet network switch or on the respective access may consist of a particular arrangement of notches or grooves or holes. Only if the connection line 261 or 262 has corresponding complementary arrangements (as for example a pin shaped according to the hole) on the element that is connected to the slot, the connection between the slot and the connection line can be established so that a distinct assignment of the connection line from the docking station to the slot of the network switch is ensured. This ensures with greater certainty during assembly of the labelling machine that any unintended interchanging of slots is avoided.

Additionally or alternatively, however, electronic means can be used to ensure the correct connection of the slot to the respective network access of the docking station. Thus, it can be provided that, on the one hand, a connection of the respective docking station with a slot of the network switch is made (via the lines 261 and 262, for example). On the other hand, a connection of the respective docking station to the actual machine control system 210 may be provided via another connection line 251 or 252 (Ethernet connection or the like). This line may also require the docking station to be as unambiguously associated with the machine control system as possible. By comparing the IP addresses or by comparing the received data, the machine control systems can then determine whether the connection of the docking station with the machine control system and a connection of a docking station with the network switch define the same docking station. For example, if this comparison results in the docking station being connected to its assigned slot on the network switch and the docking station also being connected to its assigned slot on the machine control system, the machine control system can confirm that the connection of the docking station to the network switch and machine control system is correct.

This can be done, for example, by comparing IP addresses. Alternatively, this can also be done by comparing responses to specific data signals output by the machine control system and/or the Ethernet network switch. If data packets are transmitted to the same IP addresses by the machine control system 210 on the one hand (for example via the data lines 251 and 252) and the network switch or the DHCP server on the other hand, however, the response comes from two different docking stations or two different labelling apparatuses, at least one of the connections of the docking station with the network switch or the machine control system is not correct. In this case, the machine control systems can stop the operation of the labelling machine and/or issue a warning informing the operator of the possible incorrect connection of the docking station and/or a labelling apparatus to the labelling machine. This information or warning can additionally include information about which docking stations or labelling apparatuses may be incorrectly connected. This can make it much easier for an operator to correct the error.

Alternatively or additionally, it may be provided that an additional pin is assigned to each slot, which is connected to the docking station via the access element 221 and also has a distinct identifier for the respective slot. If a signal returned via this pin matches the docking station provided for the slot, it can be determined by the machine control system that the docking station has been correctly connected to the slot of the network switch and operation of the labelling machine can be enabled.

When exchanging data from labelling apparatuses with the machine control system, complications can still arise if the labelling apparatuses are designed differently (with regard to the hardware used for the control system) or if the security numbers assigned to them differ. In such a case, regardless of the programming of the machine control system and/or the DHCP server, the desired arbitrary interchangeability of labelling apparatuses at the docking stations can no longer be given, since the assigned IP address and in particular the transmitted data are no longer merely docking station-specific, but additionally become labelling apparatus-specific, without this being intentional. Finally, according to the invention, it is only provided that a determination is made to the extent that a correct arrangement of any labelling apparatus at a provided docking station and a correct connection of a docking station with the DHCP server for the transmission of security-relevant data and/or time-critical data is established.

To avoid problems here, it may be provided, for example, that all labelling apparatuses are assigned the same security number. For example, in connection with the GuardLogix or CompactGuardLogix System, which can be used for labelling apparatuses, the security network number of the fieldbus stations of the respective labelling apparatuses, via which a connection is established with the docking station, can be preset identically. Since this number does not necessarily have to represent a unique identification, it can be set to a constant value for all labelling apparatuses during programming.

Furthermore, it can be provided that the internal circuitry and the hardware components used for the respective labelling apparatuses are all of identical design so that here, too, no deviating identification of the labelling apparatuses can be generated, which could have a detrimental effect on the identification of the respective docking station or the data transmitted via the same.

The invention claimed is:

1. A labelling machine for labelling containers, having at least one docking station for a labelling apparatus and a machine control system, wherein the docking station comprises at least one network access for establishing a network connection between the machine control system and a docked labelling apparatus, wherein the network connection is adapted to transmit security-relevant data and/or time-critical data, and wherein the network access is connected to a manageable Ethernet network switch of the machine control system with a DHCP server, wherein the DHCP server is adapted to assign a preset IP address determined by the DHCP server to the labelling apparatus connected to the network access, wherein assigning the preset IP address to the labelling apparatus connected to the network access comprises assigning a distinct IP address, by the DHCP server, to each of the network accesses so that a fixed, preset IP address is assigned to the corresponding access at the docking station by the DHCP server and wherein this fixed, preset IP address is used in turn for the communication of security-relevant data and/or time-critical data with the labelling apparatus connected to the docking station;

wherein the security-relevant data comprises data that is relevant to security of an operator and wherein the time-critical data comprises data that is relevant for a chronological sequence of processes during machine operation.

2. The labelling machine according to claim 1, wherein the labelling machine comprises at least two docking stations and wherein the IP address assigned by the DHCP server to the different docking stations are different from each other.

3. The labelling machine according to claim 1, wherein the Ethernet network switch comprises at least two slots for docking stations.

4. The labelling machine according to claim 3, wherein a distinct identifier is assigned to each slot, which unambiguously identifies the associated docking station and is different from other identifiers.

5. The labelling machine according to claim 3, wherein each slot has a physical marking, wherein connecting to a connection line for connecting the slot to a network access of a docking station is possible only if the connection line has a complementary marking.

6. The labelling machine according to claim 3, wherein an auxiliary pin for transmitting an auxiliary signal is assigned to each slot, wherein the machine control system is adapted to determine whether the network connection with a docked labelling apparatus has been correctly established based on receiving a signal via the first slot and via the auxiliary pin.

7. The labelling machine according to claim 3, wherein each network access comprises a further network connection to the machine control system, which is adapted to transmit data relevant to an operation of the labelling apparatus, wherein the machine control system is adapted to determine from a comparison of data sent via a first network connection with data sent via a second network connection whether the network connection to the manageable Ethernet network switch has been correctly established.

8. A method for establishing a network connection for transmitting security-relevant data and/or time-critical data between a labelling machine and a labelling apparatus, wherein the labelling machine comprises at least one docking station for the labelling apparatus and a machine control system, wherein the docking station comprises at least one network access with which the network connection is established between the machine control system and the docked labelling apparatus, wherein the network connection is adapted for transmitting the security-relevant data and/or time-critical data, and wherein the network access is connected to a manageable Ethernet network switch of the machine control system with a DHCP server, wherein the DHCP server assigns a preset IP address determined by the DHCP server to a labelling apparatus connected to the network access, wherein assigning the preset IP address to the labelling apparatus connected to the network access comprises assigning a distinct IP address, by the DHCP server, to each of the network accesses so that a fixed, preset IP address is assigned to the corresponding access at the docking station by the DHCP server and wherein this fixed, preset IP address is used in turn for the communication of security-relevant data and/or time-critical data with the labelling apparatus connected to the docking station;

wherein the security-relevant data comprises data that is relevant to security of an operator and wherein the time-critical data comprises data that is relevant for a chronological sequence of processes during machine operation.

9. The method according to claim 8, wherein the labelling machine comprises at least two docking stations and wherein the IP address assigned by the DHCP server to the different docking stations are different from each other.

10. The method according to claim 8 wherein the Ethernet network switch comprises at least two slots for docking stations and wherein a distinct identifier is assigned to each slot that uniquely identifies the associated docking station and is different from other identifiers.

11. The method according to claim 8, wherein each slot comprises a physical marking, wherein connecting to a connection line for connecting the slot to a network access of a docking station is possible only if the connection line comprises a complementary marking.

12. The method according to claim 8, wherein an auxiliary pin for transmitting an auxiliary signal is assigned to each slot, wherein the machine control system determines whether the network connection with a docked labelling apparatus has been correctly established based on receiving a signal via the first slot and via the auxiliary pin.

13. The method according to claim 8, wherein each network access comprises a further network connection with the machine control system, via which data relevant for the operation of the labelling apparatus is transmitted, wherein the machine control system determines from a comparison of data sent via the first network connection with data sent via the second network connection whether the network connection with the manageable Ethernet network switch has been correctly established.

* * * * *